United States Patent
Lee et al.

(10) Patent No.: US 12,080,888 B2
(45) Date of Patent: *Sep. 3, 2024

(54) SULFUR-CARBON COMPOSITE, METHOD FOR PRODUCING SAME, AND LITHIUM SECONDARY BATTERY INCLUDING SAME

(71) Applicants: LG ENERGY SOLUTION, LTD., Seoul (KR); POSTECH ACADEMY-INDUSTRY FOUNDATION, Pohang-si (KR)

(72) Inventors: Dongwook Lee, Daejeon (KR); Jinwoo Lee, Pohang-si (KR); Wongwang Lim, Pohang-si (KR); Kwonnam Sohn, Daejeon (KR); Doo Kyung Yang, Daejeon (KR); Jia Lee, Pohang-si (KR)

(73) Assignees: LG ENERGY SOLUTION, LTD., Seoul (KR); POSTECH ACADEMY-INDUSTRY FOUNDATION, Pohang-si (KR)

( * ) Notice: Subject to any disclaimer, the term of this patent is extended or adjusted under 35 U.S.C. 154(b) by 876 days.

This patent is subject to a terminal disclaimer.

(21) Appl. No.: 17/043,915

(22) PCT Filed: Sep. 2, 2019

(86) PCT No.: PCT/KR2019/011255
§ 371 (c)(1),
(2) Date: Sep. 30, 2020

(87) PCT Pub. No.: WO2020/055017
PCT Pub. Date: Mar. 19, 2020

(65) Prior Publication Data
US 2021/0020940 A1    Jan. 21, 2021

(30) Foreign Application Priority Data
Sep. 12, 2018   (KR) ........................ 10-2018-0108788

(51) Int. Cl.
*H01M 4/583*    (2010.01)
*C01B 17/00*    (2006.01)
(Continued)

(52) U.S. Cl.
CPC ............. *H01M 4/583* (2013.01); *C01B 17/00* (2013.01); *H01M 4/0471* (2013.01);
(Continued)

(58) Field of Classification Search
None
See application file for complete search history.

(56) References Cited

U.S. PATENT DOCUMENTS

| | | |
|---|---|---|
| 2013/0330619 A1 | 12/2013 | Archer et al. |
| 2015/0349331 A1 | 12/2015 | Yamanoi et al. |
| 2020/0295354 A1* | 9/2020 | Lee ........................ H01M 4/139 |

FOREIGN PATENT DOCUMENTS

| | | |
|---|---|---|
| JP | 2013-125697 A | 6/2013 |
| JP | 2014-522355 A | 9/2014 |

(Continued)

OTHER PUBLICATIONS

Machine translation of KR101820867B1, Mar. 2018.*
(Continued)

*Primary Examiner* — Jonathan Crepeau
(74) *Attorney, Agent, or Firm* — Birch, Stewart, Kolasch & Birch, LLP

(57) ABSTRACT

Discussed is a sulfur-carbon composite, a method for preparing the same, and a positive electrode for a lithium secondary battery and a lithium secondary battery including the same.

18 Claims, 7 Drawing Sheets

(51) Int. Cl.
  *H01M 4/04*  (2006.01)
  *H01M 4/36*  (2006.01)
  *H01M 4/38*  (2006.01)
  *H01M 4/62*  (2006.01)
  *H01M 10/0525*  (2010.01)
  *H01M 4/02*  (2006.01)

(52) U.S. Cl.
  CPC ............ *H01M 4/364* (2013.01); *H01M 4/38* (2013.01); *H01M 4/62* (2013.01); *H01M 4/625* (2013.01); *H01M 10/0525* (2013.01); *H01M 2004/021* (2013.01); *H01M 2004/028* (2013.01)

(56) References Cited

FOREIGN PATENT DOCUMENTS

| | | |
|---|---|---|
| JP | 2017-517603 A | 6/2017 |
| KR | 10-2014-0001935 A | 1/2014 |
| KR | 10-2014-0018907 A | 2/2014 |
| KR | 10-2014-0112451 A | 9/2014 |
| KR | 10-2017-0050882 A | 5/2017 |
| KR | 10-2018-0017975 A | 2/2018 |
| KR | 10-1820867 B1 | 3/2018 |
| WO | WO 2012/131628 A1 | 10/2012 |
| WO | WO 2014/103480 A1 | 7/2014 |
| WO | WO 2015/123552 A1 | 8/2015 |
| WO | WO 2017/127674 A1 | 7/2017 |
| WO | WO 2019093681 * | 5/2019 |

OTHER PUBLICATIONS

Extended European Search Report for European Application No. 19861050.3, dated May 18, 2021.
Sahore et al., "High-rate lithium-sulfur batteries enabled by hierarchical porous carbons synthesized via ice templation," Journal of Power Sources, vol. 297, 2015 (published online Aug. 7, 2015), pp. 188-194.
Chung et al., "The use of elemental sulfur as an alternative feedstock for polymeric materials", Nature Chemistry, 2013, vol. 5, No. 6, pp. 518-524.
Diram et al., "Improving the Charge Conductance of Elemental Sulfur via Tandem Inverse Vulcanization and Electropolymerization", ACS Macro Lett. 2015, vol. 4, No. 1, pp. 111-114.
Hu et al., "A Sulfur-Rich Copolymer@CNT Hybrid Cathode with Dual-Confinement of Polysulfides for High-Performance Lithium-Sulfur Batteries", Adv. Mater. 2017, vol. 1603835, pp. 1-6.
International Search Report (PCT/ISA/210) issued in PCT/KR2019/011255 mailed on Dec. 10, 2019.
Oschmann et al., "Copolymerization of Polythiophene and Sulfur To Improve the Electrochemical Performance in Lithium-Sulfur Batteries", Chem. Mater. 2015, vol. 27, No. 20, pp. 7011-7017.
Simmonds et al., "Inverse Vulcanization of Elemental Sulfur to Prepare Polymeric Electrode Materials for Li-S Batteries", ACS Macro Lett. 2014, vol. 3, pp. 229-232.

* cited by examiner

【Figure 1】
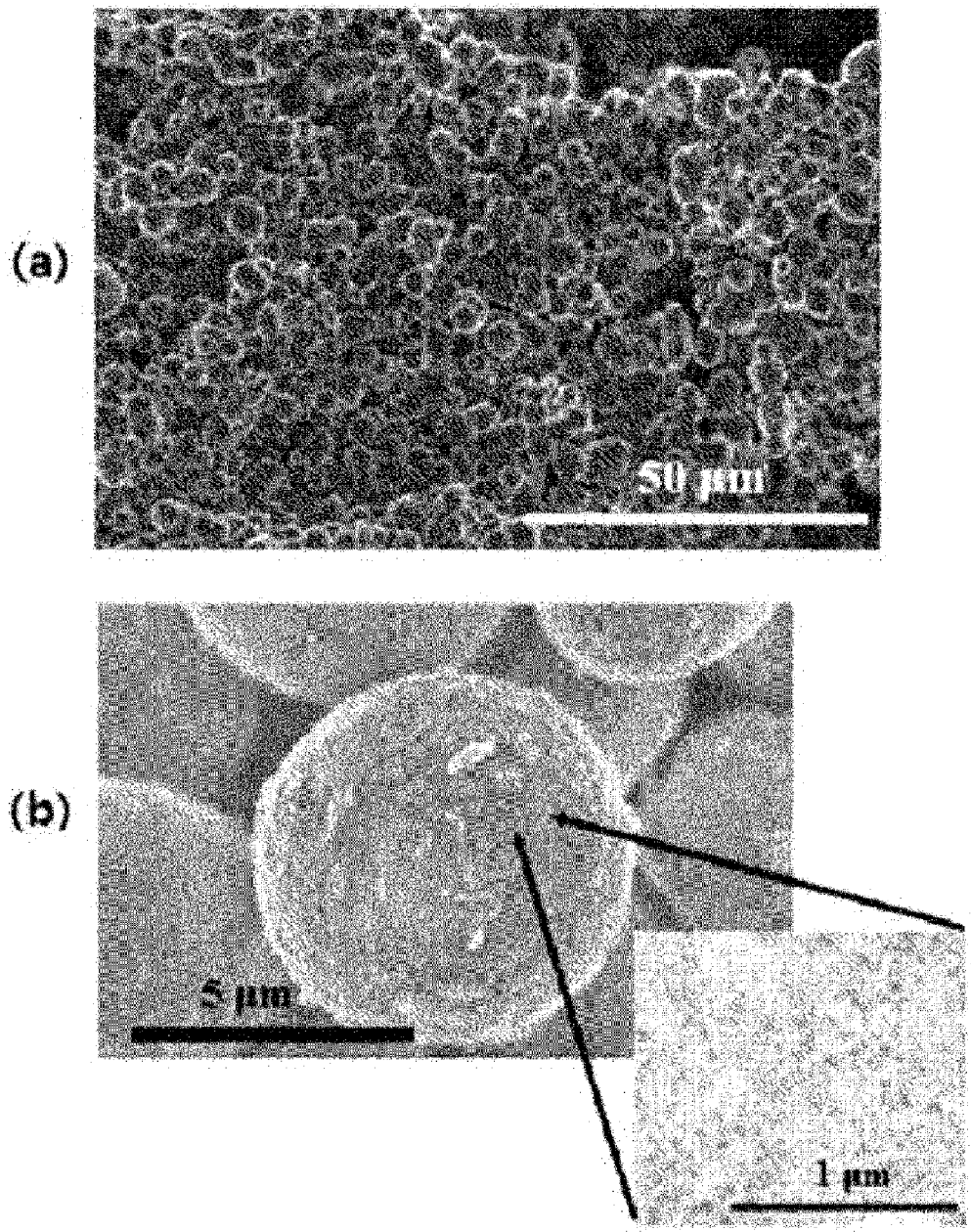

【Figure 2】
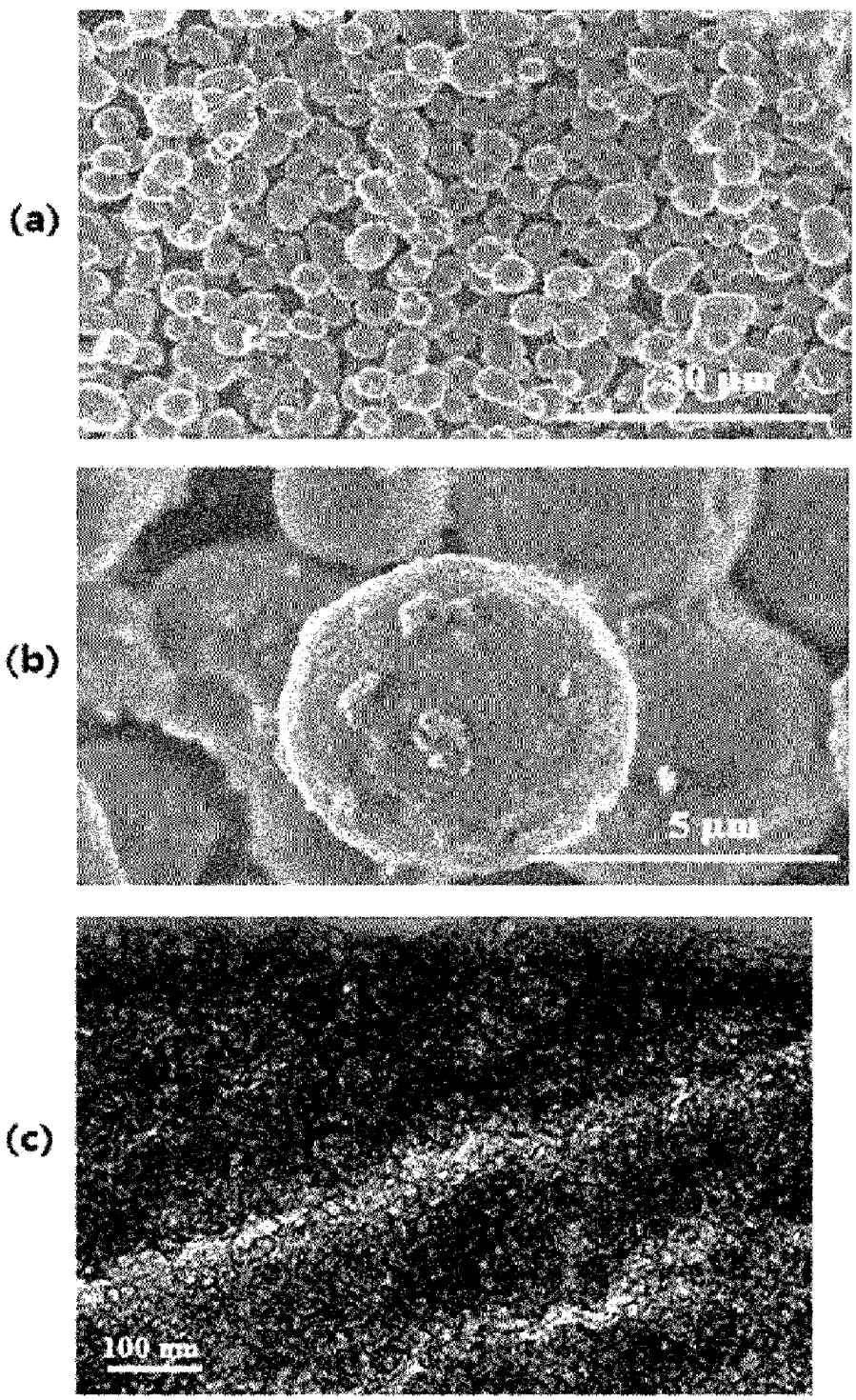

【Figure 3】
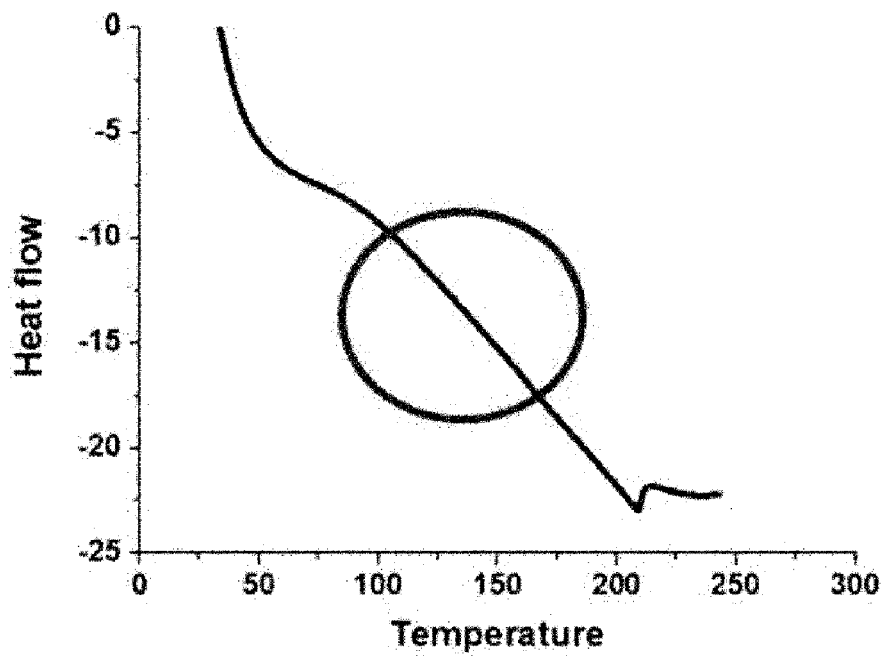
【Figure 4】
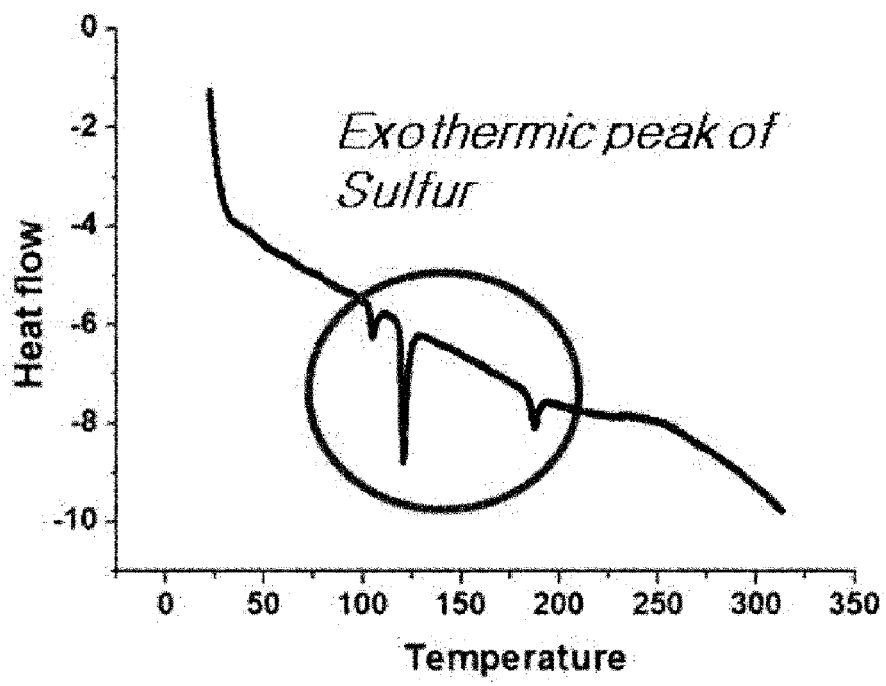

【Figure 5】
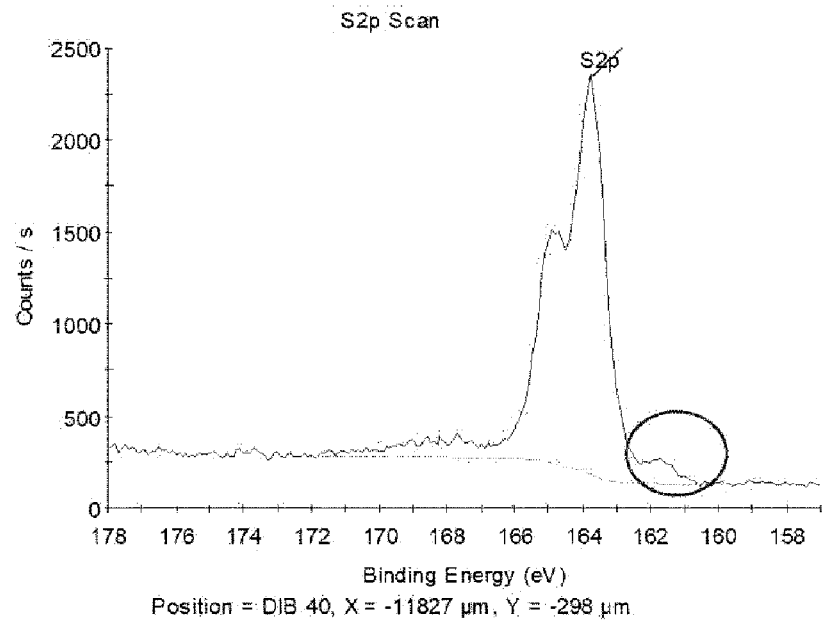
【Figure 6】
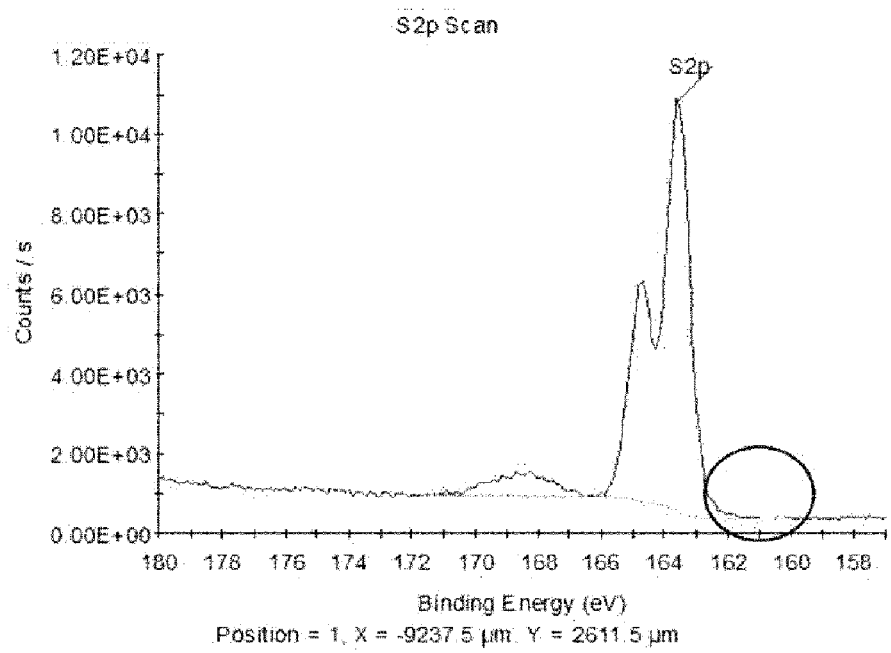

【Figure 7】
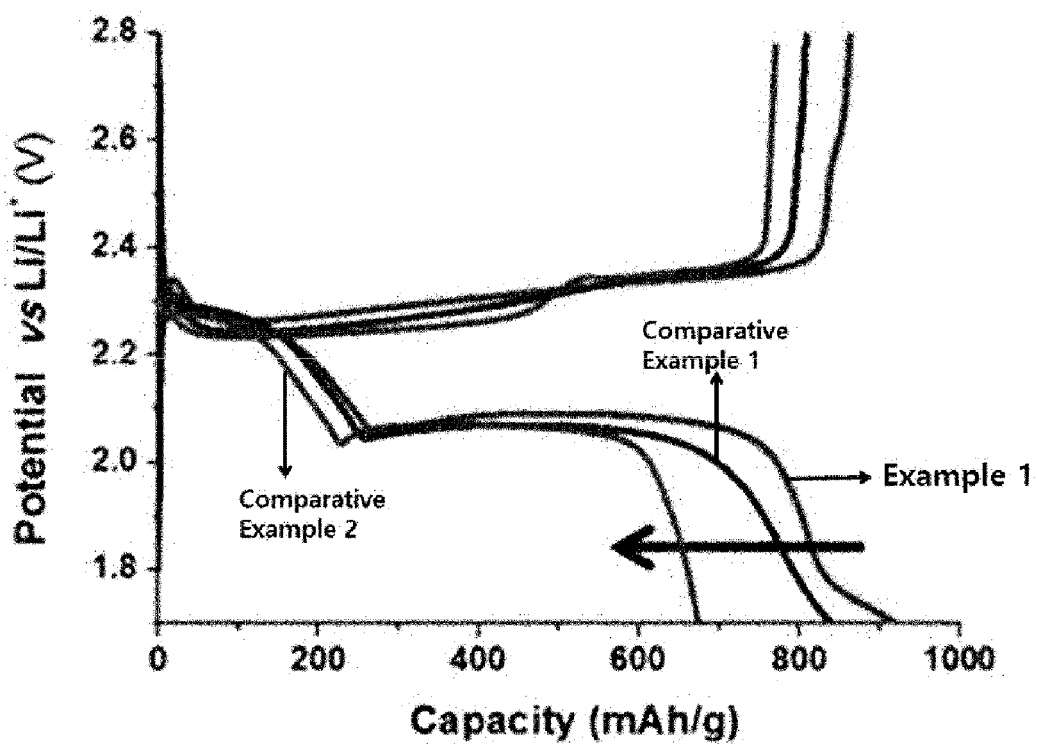
【Figure 8】
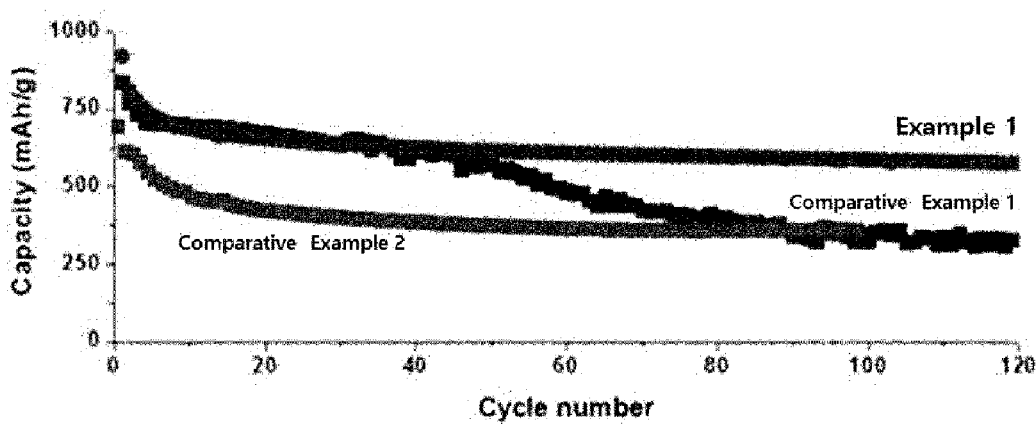

【Figure 9】
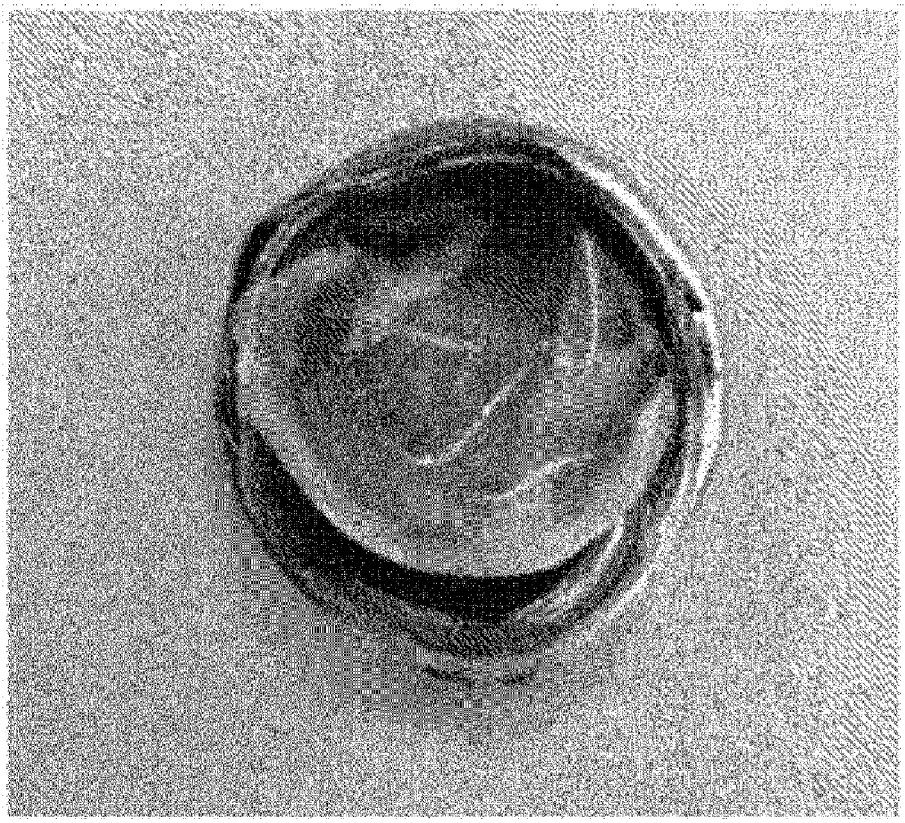

【Figure 10】
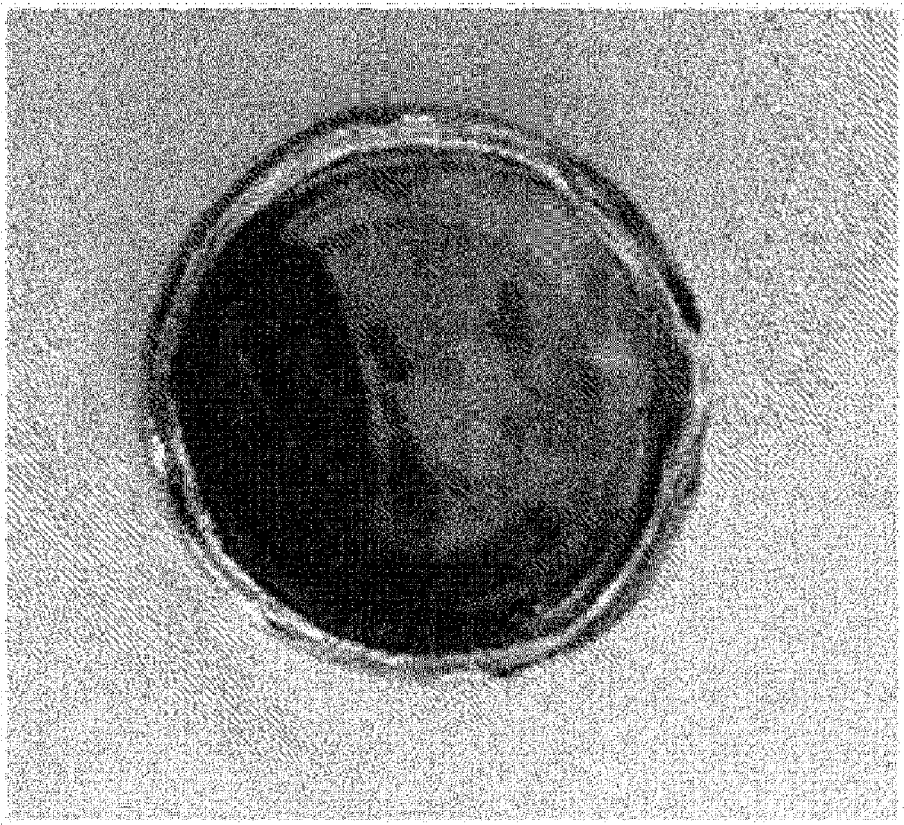

SULFUR-CARBON COMPOSITE, METHOD FOR PRODUCING SAME, AND LITHIUM SECONDARY BATTERY INCLUDING SAME

TECHNICAL FIELD

The present application claims the benefit of priority based on Korean Patent Application No. 10-2018-0108788 filed on Sep. 12, 2018, the entire disclosure of which are incorporated herein by reference its entirety.

The present invention relates to a sulfur-carbon composite, a preparation method thereof, and a lithium secondary battery comprising the same.

BACKGROUND ART

Until a recent date, there has been considerable interest in developing batteries with high energy densities using lithium as a negative electrode. For example, as compared to other electrochemical systems with a lithium inserted carbon negative electrode and a nickel or cadmium electrode that reduce the energy density of the battery by increasing the weight and volume of the negative electrode due to the presence of the non-electroactive material, since lithium metal has low weight and high capacity characteristics, lithium metal has attracted much attention as a negative electrode active material for electrochemical batteries. Lithium metal negative electrode, or negative electrodes, which mainly comprise lithium metal, provide the opportunity to construct a battery that is lighter and has a higher energy density than the battery such as a lithium-ion, nickel metal hydride or nickel-cadmium battery. These features are highly desirable for batteries for portable electronic devices, such as cell phones and lap-top computers, where premiums are paid with low weighted value.

The positive electrode active materials of these types for lithium batteries are known and comprise a sulfur-containing positive electrode active material containing a sulfur-sulfide bond, and achieve high energy capacity and rechargeability from electrochemical cleavage (reduction) and reforming (oxidation) of sulfur-sulfur bonds.

Since there are advantages that the lithium-sulfur secondary battery using lithium and alkali metal as a negative electrode active material and sulfur as a positive electrode active material as described above has theoretical energy density of 2,800 Wh/kg and theoretical capacity of sulfur of 1,675 mAh/g, which is much higher than other battery systems, and sulfur is rich in resources, is cheap and is an environmentally friendly substance, the lithium-sulfur secondary battery is attracting attention as a portable electronic device.

However, there were problems that since sulfur used as a positive electrode active material of the lithium-sulfur secondary battery is nonconductor, it is difficult to transfer electrons generated by electrochemical reaction and that the lifetime characteristics and rate characteristics of the battery are inhibited due to the leaching issue of poly sulfide ($Li_2S_8$~$Li_2S_4$) during charging/discharging and the slow kinetic of electrochemical reactions by the low electrical conductivity of sulfur and lithium sulfide ($Li_2S_2$/$Li_2S$).

In this regard, recently, in order to solve the leaching issue of polysulfide generated during charging/discharging of the lithium-sulfur secondary battery and the low electrical conductivity of sulfur and lithium sulfide, a carbon material of the porous structure with high electrical conductivity is used as a sulfur carrier.

Japanese Patent Publication No. 2013-125697 discloses a porous carbon having a pore, which is a conductive material that can be compounded with an active material as an electrode material. The porous carbon can be compounded with a compound containing sulfur and/or sulfur atom, and is capable of improving the electron conductivity of the electrode material. Specifically, the pore capacity of the electrically conductive material is 0.5 cc/g or more and 4.0 g/cc or less, the pore diameter is 100 nm or less, and the particle diameter of the conductive material is 1 nm or more and 500 μm or less.

There have been many reports on the application of such porous carbon in conventional lithium-sulfur secondary batteries, but there is still a limit to the improvement of energy density per unit weight and unit volume.

PRIOR ART DOCUMENT

Patent Document

Japanese Patent Publication No. 2013-125697, "Composition, electrode and battery comprising lithium particles."

DISCLOSURE

Technical Problem

As a result of various studies to solve the above problems, the inventors of the present invention produced a sulfur-carbon composite which can be used as a positive electrode active material of a lithium secondary battery, preferably a lithium-sulfur battery. The sulfur-carbon composite has diisopropenylbenzene and sulfur supported in the pores and on the surface of porous carbon having a mixed pore structure of the first meso pores and the second meso pores and uniform particle size. It was confirmed that the sulfur-carbon composite may control the leaching and shuttle phenomenon of the polysulfide by reacting with the polysulfide leached from the positive electrode of the lithium-sulfur battery.

Therefore, it is an object of the present invention to provide a sulfur-carbon composite that can improve the discharging capacity and lifetime characteristics of lithium-sulfur battery.

In addition, it is another object of the present invention to provide a method for preparing the sulfur-carbon composite.

In addition, it is another object of the present invention to provide a positive electrode for a lithium secondary battery comprising the sulfur-carbon composite described above, and a lithium secondary battery comprising the same.

Technical Solution

In order to achieve the above objects, the present invention provides a sulfur-carbon composite comprising porous carbon; diisopropenylbenzene; and sulfur, wherein the diisopropenylbenzene and sulfur are supported in pores and on a surface of the porous carbon, wherein the pores of the porous carbon contain first mesopores having a diameter of 2 nm to 8 nm and second mesopores having a diameter of 20 μm to 50 nm, and the porous carbon is a spherical particle having a particle diameter of 2 μm to 10 μm.

In addition, the present invention provides a method for preparing a sulfur-carbon composite comprising the steps of
 (1) dispersing porous silica in an organic solvent, and mixing a hydrate for introducing an Al acid site to prepare a porous silica dispersion;

(2) evaporating the organic solvent from the porous silica dispersion to obtain porous silica particles;

(3) performing a first heat treatment on the porous silica particles to obtain porous silica particles having the Al acid site introduced therein;

(4) impregnating pores of the porous silica particles having the Al acid site introduced therein with a carbon precursor, and then performing a second heat treatment to obtain a carbon-silica composite;

(5) etching silica from the carbon-silica composite to obtain porous carbon;

(6) preparing a solution by dissolving diisopropenylbenzene and sulfur;

(7) dispersing the porous carbon in the solution of diisopropenylbenzene and sulfur to prepare a mixture;

(8) performing a third heat treatment on the mixture to support diisopropenylbenzene and sulfur in pores of the porous carbon and on a surface of the porous carbon.

In addition, the present invention provides a positive electrode for a lithium secondary battery comprising the sulfur-carbon composite of the present invention as described above.

In addition, the present invention provides to a lithium secondary battery comprising a positive electrode; a negative electrode; a separator interposed between the positive electrode and the negative electrode; and an electrolyte solution, wherein the positive electrode is the positive electrode of the present invention as described above.

Advantageous Effects

The porous carbon of the sulfur-carbon composite according to the present invention comprises the first mesopores and the second mesopores having different sizes. Accordingly, when applied as a positive electrode active material of a lithium-sulfur battery, since the specific surface area is improved by the first mesopores, the performance of the battery may be improved, and the supported amount of sulfur and diisopropenylbenzene may be increased by the second mesopores, thereby improving energy density of the battery.

In addition, since the second mesopores provide a sufficient pore volume, the second mesopores may provide a space for facilitating inflow and outflow of the electrolyte solution while supporting sulfur and diisopropenylbenzene, thereby maximizing participation in the oxidation and reduction reactions of sulfur.

In addition, sulfur and diisopropenylbenzene are supported on the surface and in the pores of the porous carbon in a state in which they are covalently bonded, so that the polysulfide generated from the charging/discharging reactions of the lithium-sulfur battery can be reversibly reacted with diisopropenylbenzene to control the leaching of the polysulfide, thereby providing a lithium secondary battery with improved lifetime characteristics.

In addition, since the porous carbon has a uniform spherical shape and uniform size, the energy density of the battery can be improved by improving the packing density of the positive electrode active material on the current collector.

DESCRIPTION OF DRAWINGS

FIG. 1 shows SEM photographs of the porous silica prepared in Preparation Example 1.

FIG. 2 shows SEM and TEM photographs of the porous silica prepared in Preparation Example 1.

FIG. 3 is a DSC graph of sulfur-carbon composite of Example 1.

FIG. 4 is a DSC graph of sulfur-carbon composite of Comparative Example 1.

FIG. 5 is a XPS graph of sulfur-carbon composite of Example 1.

FIG. 6 is a XPS graph of sulfur-carbon composite of Comparative Example 1.

FIG. 7 is a graph measuring the discharge capacity of the lithium-sulfur battery of Experimental Example 2.

FIG. 8 is a graph showing the lifetime measurement of the lithium-sulfur battery of Experimental Example 2.

FIG. 9 is a photograph of the separator observed after 50 cycles of the lithium-sulfur battery of Example 1.

FIG. 10 is a photograph of the separator observed after 50 cycles of the lithium-sulfur battery of Comparative Example 1.

BEST MODE

Hereinafter, the present invention will be described in more detail.

Sulfur-Carbon Composite

The present invention relates to a sulfur-carbon composite comprising porous carbon; diisopropenylbenzene; and sulfur, wherein the diisopropenylbenzene and sulfur are present in pores of the porous carbon and on a surface of the porous carbon, the pores of the porous carbon contain first mesopores having a diameter of 2 nm to 8 min and second mesopores having a diameter of 20 nm to 50 nm, and the porous carbon is a spherical particle having a particle diameter of 2 μm to 10 μm.

The porous carbon is characterized by comprising the first mesopores and the second mesopores having different sizes from each other, and having a uniform particle size and shape.

Hereinafter, the size of the pores contained in the porous carbon means the diameter of the pores.

The first mesopores not only play a role of increasing the specific surface area of the porous carbon, but also show an effect of supporting sulfur and diisopropenylbenzene and thus suppressing the leaching of the polysulfide. The diameter of the first mesopores may be 2 to 8 nm, preferably 2 to 5 nm. If the diameter of the first mesopores is less than 2 nm, the pores may be excessively small so that pores may be easily blocked in the process of supporting sulfur and diisopropenylbenzene. If the diameter of the first mesopores exceeds 8 nm, the effect of increasing the specific surface area of the porous carbon may be insignificant.

The second mesopores are pores that are larger in size than the first mesopores, and thus may serve as a carrier capable of supporting more sulfur and diisopropenylbenzene. Therefore, it is possible to improve the energy density of the battery by increasing the content of sulfur and diisopropenylbenzene in the positive electrode of the lithium secondary battery, preferably the lithium-sulfur battery. Also, due to the second mesopores, the inflow and outflow of the electrolyte solution in the positive electrode of the lithium-sulfur battery are facilitated and the problem of the leaching of the polysulfide can be improved by adsorption.

The diameter of the second mesopores may be 20 to 50 nm, preferably 20 to 40 nm. If the diameter of the second mesopores is less than 20 nm, the supported amount of sulfur and diisopropenylbenzene in the second mesopores is reduced, the inflow and outflow of the electrolyte are not easy, and there is not enough space to adsorb the polysulfide, and thus the problem of leaching of the polysulfide cannot be solved. If the diameter of the second mesopores exceeds 50 nm, the size of the pores becomes excessively large, causing the problem of leaching of the polysulfide in the positive electrode and reducing the durability of the electrode.

In addition, the pore volume of the second mesopores may be 3.5 cm$^3$/g or more, preferably 3.5 to 4.5 cm$^3$/g, more preferably 3.8 to 4.2 cm$^3$/g. If the volume of the mesopores is less than 3.5 cm$^3$/g, the supported amount of sulfur and diisopropenylbenzene in the pores is reduced, so that the effect of improving the energy density of the battery is insignificant. If the volume of the mesopores exceeds the above range, the supported amount of sulfur and diisopropenylbenzene is increased, the sulfur content in the electrode is increased, and thus the energy density is improved, but the mechanical strength of the carbon structure is relatively lowered, and thus the durability of the sulfur-carbon composite and the electrode may be lowered during the preparation of the slurry for the preparation of the positive electrode.

In the porous carbon according to the present invention, the first mesopores and the second mesopores may be contained in a ratio of the pore volume of 1:20 to 70, preferably 1:30 to 60, more preferably 1:40 to 50. If the ratio of the pore volume of the second mesopores to the first mesopores is less than the above range, the specific surface area may be improved, but the supported amount of sulfur and diisopropenylbenzene is reduced, so that the effect of improving the energy density of the battery is insignificant. If the ratio of the pore volume exceeds the above range, the supported amount of sulfur and diisopropenylbenzene is increased, the ratio of the second mesopores is relatively high, so that the specific surface area may be reduced.

The specific surface area of the porous carbon according to the present invention may be 1000 to 1300 cm$^2$/g, preferably 1150 to 1300 cm$^2$/g, more preferably 1200 to 1300 cm$^2$/g. If the specific surface area of the porous carbon is less than 1000 cm$^2$/g, the discharging capacity may be lowered. If the specific surface area of the porous carbon exceeds 1300 cm$^2$/g, since the amount of the first mesopores is relatively high, the supported amount of sulfur and diisopropenylbenzene may be reduced, thereby lowering the energy density of the battery.

In addition, since the porous carbon has a uniform shape and size, when applied as a material of the positive electrode active material, it is possible to improve the packing density of the positive electrode active material on the current collector, thereby physically preventing the leaching inhibition of polysulfide of lithium-sulfur battery and improving the electrical conductivity.

Specifically, the porous carbon has a spherical uniform shape, and has a uniform size of particle diameter of 2 to 10 μm, preferably 3 to 7 μm, more preferably 4 to 6 μm. If the particle diameter of the porous carbon is less than 2 μm, the supported amount of sulfur and diisopropenylbenzene may be reduced. If the particle diameter of the porous carbon exceeds 10 μm, the packing density of the positive electrode active material on the current collector may be lowered.

The porous carbon may be comprised in an amount of 5 to 30% by weight, preferably 10 to 20% by weight based on the total weight of the sulfur-carbon composite. If the porous carbon is comprised in an amount of less than 5% by weight, electron transfer between sulfur and carbon is lowered, and the interface area between sulfur and carbon is reduced, so that the absolute amount of sulfur that can participate in the electrochemical reaction is reduced, thereby reducing the reversible capacity and thus degrading the performance of the battery. If the porous carbon is comprised in an amount exceeding 30% by weight, the content of sulfur is reduced and the energy density of the positive electrode cannot be increased.

Diisopropenylbenzene (DIB) and sulfur are supported in the pores and on the surface of the porous carbon in a state in which they are covalently bonded.

That is, the sulfur-carbon composite of the present invention is a form in which diisopropenylbenzene and sulfur are supported in the pores and on the surface of the porous carbon, and diisopropenylbenzene and sulfur are supported on the surface and in the pores of the porous carbon in a state in which they are covalently bonded.

In the heat treatment process for preparing the sulfur-carbon composite, the S—S bond of the ring-shaped sulfur ($S_8$) is broken and radicals having high reactivity are formed. The radical sulfur thus formed reacts with a double bond (C═C) present in diisopropenylbenzene to form a new S—C bond, and thus sulfur and diisopropenylbenzene form a covalent bond.

The porous carbon includes the first mesopores and the second mesopores as described above, and thus has a large specific surface area. Therefore, sulfur and diisopropenylbenzene, which form the covalent bonds, are more supported in the pores than the surface of the porous carbon.

More specifically, sulfur and diisopropenylbenzene, which form covalent bonds, are supported on the porous carbon in a manner that solidifies from the molten state, and thus are supported on both the pores and the surface of the porous carbon. In addition, when preparing the sulfur-carbon composite, the amount of sulfur and diisopropenylbenzene less than the amount that can be theoretically supported in consideration with the pore volume of porous carbon is supported inside the pores in the molten state. In this case, since sulfur and diisopropenylbenzene in the liquid phase have a stronger driving force to be sucked into the first and second mesopores by the capillary phenomenon than the surface of the porous carbon, the sulfur and diisopropenylbenzene are more supported in the pores than the surface of the porous carbon.

The diisopropenylbenzene reversibly reacts with polysulfide generated during charging/discharging of the lithium-sulfur battery and thus plays a role of efficiently controlling the leaching problem of polysulfide.

Therefore, if not only sulfur is supported on the porous carbon, but also diisopropenylbenzene is supported, the leaching inhibition of the polysulfide can be maximized to further improve the lifetime characteristics of the lithium-sulfur battery.

The diisopropenylbenzene is comprised in an amount of 5 to 30% by weight, preferably 10 to 20% by weight based on the total weight of the sulfur-carbon composite. If the diisopropenylbenzene is included in an amount of less than 5% by weight, the adsorption effect of the polysulfide is insignificant. If the diisopropenylbenzene exceeds 30% by weight, the sulfur content is relatively low, and thus the amount of active material of the electrode and the energy density of the battery cannot be increased.

The sulfur may be at least one selected from the group consisting of elemental sulfur ($S_8$) and sulfur-based compounds. Specifically, the sulfur-based compound may be selected from $Li_2S_n$ (n≥1), an organic sulfur compound or a carbon-sulfur polymer (($C_2S_x)_n$: 2.5≤x≤50, n≥2).

The content of sulfur may be 60 to 85 wt. %, preferably 70 to 80 wt. %, based on the total weight of the sulfur-carbon composite. If the content of sulfur is less than 60 wt. %, the electrical energy density of the battery may be lowered. If the amount of sulfur is more than 85 wt. %, the volume expansion of sulfur and low electrical conductivity during charging/discharging may be problems.

Preparation Method of Sulfur-Carbon Composite

In addition, the present invention relates to a method for preparing the sulfur-carbon composite of the present invention.

The method for preparing the sulfur-carbon composite comprises the steps of:
(1) dispersing porous silica in an organic solvent, and mixing a hydrate for introducing an Al acid site to prepare a porous silica dispersion;
(2) evaporating the organic solvent from the porous silica-solution dispersion to obtain porous silica particles;
(3) performing a first heat treatment on the porous silica particles to obtain porous silica particles having the Al acid site introduced therein;
(4) impregnating pores of the porous silica particles having the Al acid site introduced therein with a carbon precursor, and then performing a second heat treatment to obtain a carbon-silica composite;
(5) etching silica from the carbon-silica composite to obtain porous carbon;
(6) preparing a solution by dissolving diisopropylbenzene and sulfur;
(7) dispersing the porous carbon in the solution of diisopropylbenzene and sulfur to prepare a mixture; and
(8) performing a third heat treatment on the mixture to support diisopropylbenzene and sulfur in pores of the porous carbon and on a surface of the porous carbon.

Step (1) is a step of dispersing the porous silica in an organic solvent, and mixing a hydrate for introducing an Al acid site to prepare a porous silica dispersion.

In the present invention, the porous silica plays a role of a template for synthesizing the porous carbon. When porous silica having a particle size of 2 to 10 μm is used, it may be advantageous to synthesize porous carbon having uniform shape and size.

The organic solvent may be at least one selected from the group consisting of ethanol, methanol, propanol, butanol, ethyl acetate, chloroform, and hexane, but is not limited as long as it is an organic solvent capable of dispersing porous silica.

The hydrate for introducing the Al acid site may be aluminum chloride hexahydrate and is used to introduce the Al acid site into the porous silica.

The porous silica dispersion in step (1) may be prepared by using 1 to 5 parts by weight of the porous silica and 0.21 to 1.05 parts by weight of the hydrate for introducing the Al acid site, relative to 100 parts by weight of the organic solvent.

If the amount of the porous silica is less than 1 part by weight, the yield of porous carbon produced is lowered and the relative ratio of the acid sites is increased, and thus there may be a restriction on the carbonization reaction. If the amount of the porous silica exceeds 5 parts by weight, the relative ratio of the acid sites may be lowered and thus the polymerization of the carbon precursor for the synthesis reaction of the porous carbon may be difficult to proceed.

If the amount of the hydrate for introducing the Al acid site is less than 0.21 part by weight, the acid sites introduced into the porous silica may be insufficient, and thus the polymerization reaction of the carbon precursor in porous carbon synthesis process may be difficult to proceed. If the amount of the hydrate for introducing the Al acid site exceeds 1.05 parts by weight, the acid site is rather excessive and thus the synthesis reaction of the porous carbon may be difficult to proceed.

Step (2) is a step of evaporating the organic solvent from the porous silica dispersion prepared in step (1) to obtain porous silica particles.

By evaporating the organic solvent while stirring the porous silica dispersion at room temperature, residual porous silica particles can be obtained.

Step (3) is a step of performing a first heat treatment the porous silica particles obtained in step (2) to obtain porous silica particles having an Al acid site introduced therein.

The Al acid site is located on the surface of silica to induce polymerization reaction of a carbon precursor such as furfuryl alcohol and plays a role in promoting the synthesis of porous carbon.

The first heat treatment may be performed by raising the temperature to 500 to 600° C. at a rate of 0.5° C./min to 3° C./min in an air atmosphere.

If the rate of temperature rise during the first heat treatment is less than 0.5° C./min, the time required for heat treatment becomes longer, and thus the physical properties of the porous silica particles may be denatured. If the rate of temperature rise exceeds 3° C./min, the acid sites may not be formed as much as desired in the porous silica particles.

If the temperature of the first heat treatment is less than 500° C., the acid sites may not be formed as much as desired in the porous silica particles. If the temperature of the first heat treatment exceeds 600° C., the physical properties of the porous silica particle may be denatured.

Step (4) is a step of impregnating the pores of the porous silica particles having an Al acid site introduced therein prepared in step (3) with the carbon precursor, and then performing a second heat treatment to obtain a carbon-silica composite.

At this time, the carbon precursor can be impregnated into the pores of the porous silica particles in the form of a solution.

In the present invention, the carbon precursor may be at least one selected from the group consisting of furfuryl alcohol, sucrose and glucose.

In the present invention, since the carbon precursor in a liquid phase is used as the carbon precursor, a separate solvent for dissolving the carbon precursor may not be required. However, the carbon precursor as the liquid phase may be further dissolved in the solvent. At this time, the solvent used in the solution of the carbon precursor may be tetraethylene glycol dimethyl ether (TEGDME).

The solution of the carbon precursor may be prepared by mixing the carbon precursor and the solvent at a weight ratio of 1:0.5 to 1.5. If the weight ratio of the solvent to the carbon precursor is 1:less than 0.5, since the amount of the carbon precursor is relatively high, the wall thickness of the pore can be increased and thus the pore volume of the porous carbon which is a product can be reduced. On the other hand, if the weight ratio is 1:more than 1.5, the amount of carbon precursor contained in the solution may be small and thus the wall thickness of the pores may be reduced and it may be difficult to maintain the shape of the porous carbon.

Therefore, the volume of the micropores and mesopores can be controlled by tetraethylene glycol dimethyl ether, a solvent for further dissolving the carbon precursor in the liquid phase.

In the present invention, the second heat treatment is a process for inducing polymerization of a carbon precursor wherein a carbon-silica composite can be obtained by the second heat treatment.

The temperature of the second heat treatment may be 70° C. to 100° C., preferably 75° C. to 95° C., more preferably 80° C. to 90° C. If the temperature of the second heat treatment is less than the above range, the polymerization reaction rate of the carbon precursor is not fast or is not properly initiated. If the temperature of the second heat treatment exceeds the above range, the physical properties of the formed carbon-silica composite may be denatured.

The time period of the second heat treatment may be 7 hours to 10 hours, preferably 7.5 hours to 9.5 hours, more preferably 8 hours to 9 hours. If the time period of the second heat treatment is less than 7 hours, the polymerization reaction of the carbon precursor cannot be completely completed. If the time period of the second heat treatment exceeds 10 hours, the excess time period does not significantly affect the outcome of the reaction and thus there is no benefit arising from exceeding the time period of heat treatment.

Also, if the heat treatment is performed within the range of the temperature and the time period of the heat treatment specified as the condition for the second heat treatment, the uniformity of shape and size of the porous carbon produced can be improved.

Also, in the present invention, the method may further comprise a heat treatment step which is performed by raising the temperature at a rate of 0.5° C./min to 1° C./min under an inert atmosphere after the second heat treatment and heat-treating at 700° C. to 1000° C. for 1 hour to 5 hours.

The inert atmosphere may be formed by at least one inert gas selected from the group consisting of argon, nitrogen, helium, neon, and krypton. When argon among the inert gases is used, the reaction from which the carbon-silica composite is formed can be performed more smoothly. Therefore, it may be preferable that the inert atmosphere is formed of argon among the inert gases.

If the rate of temperature rise during the heat treatment is less than 0.5° C./min, the carbon-silica composite is incompletely formed. If the heating rate exceeds 1° C./min, there may be a problem that affects the overall porous structure.

If the temperature of the heat treatment is less than 700° C., the carbon-silica composite is incompletely formed. If the temperature of the heat treatment exceeds 1000° C., the physical properties of the formed carbon-silica may be denatured.

Also, if the heat treatment is performed within the ranges of the temperature raising rate, the temperature, and the time period of the heat treatment specified as the condition for the heat treatment, the uniformity of shape and size of the porous carbon produced can be further improved.

Step (5) is a step of etching silica from the carbon-silica composite prepared in step (4) to obtain porous carbon.

The carbon-silica composite may be dispersed in a solution in which an organic solvent and water are mixed, and silica may be etched using an etching solution.

Considering the dispersibility of the carbon-silica composite, the organic solvent and water may be mixed in a weight ratio of 1:0.8 to 1.2. The organic solvent may be at least one selected from the group consisting of ethanol, methanol, propanol, butanol, ethyl acetate, chloroform and hexane.

The etching solution may be a solution containing at least one selected from the group consisting of hydrofluoric acid (HF), hydrogen peroxide ($H_2O_2$), nitric acid ($HNO_3$), potassium hydroxide (KOH) and sodium hydroxide (NaOH).

As described above, the porous carbon has first mesopores having a diameter of 2 to 8 nm and second mesopores having a diameter of 20 to 50 nm, and are spherical particles having a particle diameter of 2 to 10 μm.

In addition, the first mesopores and the second mesopores are included in a pore volume ratio of 1:20 to 70. The volume of the second mesopores is at least 3.5 $cm^3/g$.

In addition, the specific surface area of the porous carbon is 1000 to 1300 $cm^2/g$.

Step (6) is a step of preparing a solution by dissolving diisopropenylbenzene and sulfur.

The diisopropenylbenzene and sulfur may be mixed in a weight ratio of 5:95 to 30:70, preferably in a weight ratio of 10:90 to 20:80.

If the diisopropenylbenzene is comprised in an amount of less than the above range, electron transfer between sulfur and carbon is lowered, and the amount forming covalent bonds with sulfur is low, so that leaching of sulfur is likely to occur, and the lifetime of the battery may be reduced. In addition, if the diisopropenylbenzene is included in an amount exceeding the above range, the sulfur content of the positive electrode is reduced, and thus the energy density cannot be increased.

In addition, the solvent for dissolving the diisopropenylbenzene and sulfur is a solvent which can dissolve both diisopropenylbenzene and sulfur and in particular having high solubility to sulfur. If the solvent having high solubility to sulfur is used, it is possible for the solution of sulfur and diisopropenylbenzene to be supported on the surface and pores of the porous carbon.

The solvent may be at least one selected from the group consisting of $CS_2$, ethylenediamine, acetone and ethanol, preferably $CS_2$.

If the $CS_2$ solvent is used, the solvent has a high selective solubility to sulfur and thus it may be advantageous for sulfur to be dissolved and to be supported in the inside and on the surface of the pores contained in the porous carbon.

Step (7) is a step of dispersing the porous carbon prepared in step (5) in the solution prepared in step (6) to prepare a mixture.

By evenly dispersing porous carbon in the solution of diisopropenylbenzene and sulfur, and then evaporating all the solvent in the solution containing diisopropenylbenzene, sulfur and porous carbon while stirring at a temperature of 25 to 40° C. for 8 to 12 hours, a mixture in the form of powder which contains diisopropenylbenzene, sulfur and porous carbon may be prepared.

In this case, the mixture in the form of powder has a shape in which sulfur and diisopropenylbenzene are supported in the pores and on surface of porous carbon.

If the temperature is less than 25° C., the evaporation rate of the solvent may be so low that it takes too long time to prepare the powder. If the temperature exceeds 40° C., the evaporation rate of the solvent may be so high that the supporting of sulfur and diisopropenylbenzene does not occur completely inside the pore of the porous carbon.

Step (8) is a step of forming a covalent bond between diisopropenylbenzene and sulfur supported in the pore and on the surface of the porous carbon by performing a third heat treatment on the mixture prepared in step (7).

The third heat treatment is a step of forming a covalent bond of diisopropenylbenzene and sulfur in the pore and on the surface of the porous carbon, wherein a sulfur-carbon composite having sulfur and diisopropenylbenzene supported in the pore and on the surface of the porous carbon may be obtained by the third heat treatment, and specifically, sulfur and diisopropenylbenzene form a covalent bond.

In addition, diisopropenylbenzene and sulfur may form a covalent bond by the third heat treatment, and diispropenylbenzene can effectively control the leaching problem of polysulfides by reversibly reacting with polysulfides generated during charging/discharging of the lithium-sulfur battery, thereby improving the lifetime characteristics of the lithium-sulfur battery.

The third heat treatment is performed for 1 minute to 30 minutes at a temperature of 100 to 200° C. in the oil bath, preferably for 5 minutes to 10 minutes at a temperature of 150 to 185° C.

If the temperature for the third heat treatment is less than 100° C., since the S—S bonds of sulfur are hard to break, no highly reactive sulfur radicals are produced, and thus covalent bonds are not formed with diisopropenylbenzene, and if the temperature exceeds 200° C., sulfur or diisopropenylbenzene may be vaporized.

In addition, if the time for the third heat treatment is less than 1 minute, the covalent bonds of sulfur and diisopropenylbenzene may not be completely achieved, and if the time for the third heat treatment exceeds 30 minutes, sulfur or diisopropenylbenzene may be vaporized.

Positive Electrode for Lithium Secondary Battery

In addition, the present invention relates to a positive electrode for a lithium secondary battery, preferably to a positive electrode for a lithium-sulfur battery, wherein the positive electrode for the lithium secondary battery comprises the sulfur-carbon composite as described above The positive electrode comprises a positive electrode current collector, and a positive electrode active material layer formed on the positive electrode current collector. The positive electrode active material layer may comprise the positive electrode active material and optionally a conductive material and binder.

The conductive material may be comprised for the purpose of smoothly moving electrons in the positive electrode along with the positive electrode active material. The binder may be comprised for the purpose of increasing the binding force between the positive electrode active materials or between the positive electrode active material and the current collector.

The positive electrode current collector may be generally made to have a thickness of 3 to 500 μm, and is not particularly limited as long as it has high electrical conductivity without causing chemical changes in the battery. For example, a conductive metal such as stainless steel, aluminum, copper, titanium, or the like can be used, and preferably an aluminum current collector can be used. The positive electrode current collector may use various forms such as film, sheet, foil, net, porous body, foam, nonwoven fabric and the like The conductive material may be carbon-based materials such as carbon black, acetylene black, and ketjen black; or conductive polymers such as polyaniline, polythiophene, polyacetylene, polypyrrole and may be preferably comprised in an amount of 5 to 20 wt. % based on the total weight of the positive electrode active material layer. If the content of the conductive material is less than 5 wt. %, the effect of improving the conductivity by the use of the conductive material is insignificant. On the other hand, if the content of the conductive material exceeds 20 wt. %, the content of the positive electrode active material becomes relatively small, and thus there is a possibility that the capacity characteristics may be deteriorated.

In addition, the binder may be poly(vinyl acetate), polyvinylalcohol, polyethyleneoxide, polyvinylpyrrolidone, alkylated polyethyleneoxide, cross-linked polyethyleneoxide, polyvinylether, poly(methylmethacrylate), polyvinylidene fluoride, copolymer of polyhexafluoropropylene and polyvinylidene fluoride(product name: Kynar), poly (ethylacrylate), polytetrafluoroethylene, polyvinylchloride, polyacrylonitrile, polyvinylpyridine, polystyrene, and derivatives, blends and copolymers thereof and the like. Also, the binder may be preferably comprised in an amount of 5 to 20 wt. % based on the total weight of the positive electrode active material layer. If the content of the binder is less than 5 wt. %, the effect of improving the adhesion between the positive electrode active materials or between the positive electrode active material and the current collector depending on the use of the binder is insufficient. On the other hand, if the content of the binder exceeds 20 wt. %, the content of the positive electrode active material becomes relatively small, and thus there is a possibility that the capacity characteristics may be deteriorated.

The positive electrode as described above may be prepared by a conventional method, and specifically, can be prepared by applying the composition for forming the positive electrode active material layer prepared by mixing the positive electrode active material, the conductive material and the binder in an organic solvent, on a current collector, followed by drying and optionally rolling.

At this time, the organic solvent may be a solvent which can uniformly disperse the positive electrode active material, the binder, and the conductive material, and which is easily evaporated. Specifically, the organic solvent may comprise acetonitrile, methanol, ethanol, tetrahydrofuran, water, isopropyl alcohol and the like.

The positive electrode comprising the sulfur-carbon composite according to the present invention can increase the density of the positive electrode because the porous carbon of the sulfur-carbon composite has a uniform size and shape.

Lithium Secondary Battery

In addition, the present invention relates to a lithium secondary battery comprising a positive electrode; a negative electrode; a separator interposed between the positive electrode and the negative electrode; and an electrolyte solution, wherein the positive electrode is the positive electrode of the present invention as described above.

In addition, the lithium secondary battery of the present invention may be preferably a lithium-sulfur battery.

The negative electrode may be composed of a current collector and a negative electrode active material layer formed on one side or both sides thereof. In addition, the negative electrode may be a lithium metal plate.

The current collector is for supporting the negative electrode active material and is not particularly limited as long as it is electrochemically stable in the voltage range of the lithium secondary battery while having excellent electrical conductivity, and for example, copper, stainless steel, aluminum, nickel, titanium, palladium, sintered carbon, or copper or stainless steel whose surface is treated with carbon, nickel, silver or the like, or aluminum-cadmium alloy or the like may be used.

The negative electrode current collector can enhance the bonding force with the negative electrode active material by having fine irregularities on its surface, and may be formed in various forms such as film, sheet, foil, mesh, net, porous body, foam or nonwoven fabric.

The negative electrode active material may comprise a material capable of reversibly intercalating or deintercalating lithium ion, a material capable of reversibly forming lithium containing compounds by reacting with lithium ion, lithium metal or lithium alloy.

The material capable of reversibly intercalating or deintercalating lithium ion can be, for example, crystalline carbon, amorphous carbon, or a mixture thereof.

The material capable of reacting with lithium ion to reversibly form lithium containing compounds may be, for example, tin oxide, titanium nitrate or silicon.

The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

A separator is additionally comprised between the positive electrode and the negative electrode. The separator enables the lithium ion to be transported between the positive electrode and the negative electrode while separating or insulating the positive electrode and the negative electrode from each other. Such separator may be made of a porous, nonconductive or insulating material. The separator may be an independent member such as a film, or a coating layer added to the positive electrode and/or the negative electrode.

Materials for forming the separator comprise, but are not limited to, polyolefins such as polyethylene and polypropylene, glass fiber filter paper, and ceramic materials. The separator may have a thickness of about 5 to about 50 μm, preferably about 5 to about 25 μm.

The electrolyte is a non-aqueous electrolyte containing lithium salt and is composed of lithium salt and an electrolyte solution, and as the electrolyte solution, non-aqueous organic solvent, organic solid electrolyte and inorganic solid electrolyte are used.

The lithium salt may be used without limitation as long as it is conventionally used in an electrolyte for a lithium secondary battery, preferably a lithium-sulfur battery. For example, the lithium salt may comprise at least one selected from the group consisting of LiSCN, LiBr, LiI, $LiPF_6$, $LiBF_4$, $LiB_{10}Cl_{10}$, $LiSO_3CF_3$, LiCl, $LiClO_4$, $LiSO_3CH_3$, $LiB(Ph)_4$, $LiC(SO_2CF_3)_3$, $LiN(SO_2CF_3)_2$, $LiCF_3CO_2$, $LiAsF_6$, $LiSbF_6$, $LiAlCl_4$, LiFSI, lithium chloroborane, lithium lower aliphatic carboxylate, and the like.

In addition, the concentration of the lithium salt in the electrolyte solution may be 0.2 to 2 M, preferably 0.6 to 2 M, more preferably, 0.7 to 1.7 M. If the concentration of the lithium salt is less than 0.2 M, the conductivity of the electrolyte solution may be lowered and thus the performance of the electrolyte may be deteriorated. If the concentration of the lithium salt exceeds 2 M, the viscosity of the electrolyte solution may increase and thus the mobility of the lithium ion may be reduced.

The non-aqueous organic solvent should dissolve the lithium salt well, and the non-aqueous organic solvent of the present invention may comprise, for example, aprotie organic solvents such as N-methyl-2-pyrrolidone, propylene carbonate, ethylene carbonate, butylene carbonate, dimethyl carbonate, diethyl carbonate, ethyl methyl carbonate, gamma-butyrolactone, 1,2-dimethoxyethane, 1,2-diethoxyethane, tetrahydrofuran. 2-methyl tetrahydrofuran, dimethylsulfoxide, 1,3-dioxolane, 4-methyl-1,3-dioxane, diethylether, formamide, dimethylformamide, dioxolane, acetonitrile, nitromethane, methyl formate, methyl acetate, phosphate triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate, and these organic solvents can be used alone or in a mixed solvent form of two or more solvents thereof.

As the organic solid electrolyte, for example, polyethylene derivatives, polyethylene oxide derivatives, polypropylene oxide derivatives, phosphate ester polymers, polyalginate lysine, polyester sulfide, polyvinyl alcohol, polyvinylidene fluoride, and polymers comprising ionic dissociation groups and the like can be used.

As the inorganic solid electrolyte, for example, nitrides, halides, sulfates and the like of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$ may be used.

To the electrolyte of the present invention, for example, pyridine, triethylphosphite, triethanolamine, cyclic ether, ethylene diamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxy ethanol, or aluminum trichloride, etc. may also be added for the purpose of improving charging-discharging characteristics, flame retardancy, and the like. In some cases, a halogen-containing solvent such as carbon tetrachloride, ethylene trifluoride or the like can be also added for the purpose of imparting nonflammability, and a carbon dioxide gas can be further comprised for the purpose of improving storage characteristics at a high temperature, and fluoroethylene carbonate (FEC), propene sultone (PRS), fluoropropylene carbonate (FPC) and the like can be further comprised.

The electrolyte may be used as a liquid electrolyte or also as an electrolyte separator form in a solid state. When used as a liquid electrolyte, a separator made of porous glass, plastic, ceramic, or polymer is further comprised as a physical separator having a function of physically separating the electrodes.

The lithium secondary battery of the present invention, preferably lithium-sulfur battery includes the sulfur-carbon composite of the present invention as a positive electrode active material. The porous carbon in the sulfur-carbon composite has a large pore volume by comprising the second mesopores together with the first mesopores, and thus is easy to inflow and outflow of the electrolyte because the pores are not blocked even after the support of sulfur and diisopropenylbenzene, thereby showing excellent discharging capacity and output characteristics, while having high specific surface area by comprising the first mesopores, as compared to the activated carbon containing only micropores In addition, sulfur and diisopropenylbenzene are supported in the pores and on the surface of the porous carbon, and sulfur and diisopropenylbenzene form a covalent bond. Diisopropenylbenzene can be reversibly reacted with the polysulfides generated during charging/discharging of the lithium-sulfur battery, thereby resolving the leaching problem of the polysulfides and thus improving the lifetime characteristic of the lithium-sulfur battery.

Hereinafter, preferred examples are provided to help understand the present invention. However, it will be apparent to those skilled in the art that the following examples are illustrative of the present invention and that various changes and modifications can be made within the scope and spirit of the present invention, and such variations and modifications are within the scope of the appended claims.

PREPARATION EXAMPLE 1

Preparation of Porous Carbon 8.0 g of a triple block copolymer $EO_{20}PO_{70}EO_{20}$ (trade name: Pluronic P123, EO: ethylene glycol, PO: propylene glycol), 10 g of potassium chloride (KCl) and 20 mL of 37.2 wt. % hydrochloric acid (HCl) were mixed with 130 mL of water and 10 mL of ethanol, and the mixture was stirred at room temperature for 8 hours or more. Next, when Pluronic P123 was completely dissolved, 9.26 mL of mesitylene was added and stirred at 40° C. for 2 hours.

18.4 mL of tetraethylorthosilicate (TEOS), a silica source, was added and stirred vigorously at the same temperature for 2 minutes. The mixed solution was kept at the same temperature for 20 hours. Thereafter, 0.092 g of ammonium fluoride was added to the mixed solution, stirred vigorously for 2 minutes, and then hydrothermally synthesized in an oven at 100° C. for 24 hours. Then, the mixture was filtered with a mixture of ethanol and water, dried at room temperature, and heat-treated at 550° C. for 4 hours in an air atmosphere to finally synthesize porous silica.

FIG. 1 is scanning electron microscope (SEM) photographs of porous silica.

Referring to FIG. 1(a), it can be seen that a porous silica having a spherical particle shape and mesopore was produced.

In addition, FIG. 1(b) is an enlarged photograph of FIG. 1(a). It can be seen that the diameter of the prepared porous silica is 5 μm, and mesopore is well developed.

1 g of spherical porous silica prepared was uniformly dispersed in 50 ml of ethanol and 0.21 g of aluminum chloride hexahydrate was mixed together and stirred for 2 hours to obtain a porous silica dispersion.

While the porous silica dispersion was stirred at room temperature, all of the solvent ethanol was evaporated.

Thereafter, the remaining powder of porous silica particles was collected, heated at 1° C./min in an air atmosphere to raise the temperature to 550° C. and thus subjected to the first heat treatment and maintained for 5 hours.

After the first heat treatment, the pore volume of the porous silica with the introduced Al acid site was measured, furfuryl alcohol as much as ½ volume of the measured pore volume and tetraethylene glycol dimethyl ether (TEGDME) as much as ½ volume of the measured pore volume were mixed and impregnated using a vacuum. That is, the weight ratio of furfuryl alcohol as a carbon precursor and tetraethylene glycol dimethyl ether as a solvent is 1:1.

After that, the mixture was maintained in an oven at 80° C. for 8 hours to perform the second heat treatment to induce polymerization of furfuryl alcohol.

In addition, the temperature was raised at a rate of 1° C./min in an Ar atmosphere to raise the temperature to 850° C. and maintained for 3 hours to prepare a carbon-silica composite.

The carbon silica composite was dispersed in a mixed solution of ethanol and water at a weight ratio of 1:1, and silica was etched with HF to prepare porous carbon.

FIG. 2 are scanning electron microscope (SEM) and transmission electron microscope (TEM) photographs of porous carbon.

FIG. 2(a) is a SEM photograph of the porous carbon, from which it can be seen that the spherical porous carbon was synthesized as a whole.

FIG. 2(b) is an enlarged SEM photograph of the porous carbon, from which it can be seen that the particle diameter of the spherical porous carbon is 5 μm.

FIG. 2(c) is a TEM photograph of the porous carbon, from which it can be seen that the well-developed porous carbon having a first mesopore of 4 nm pore size and a second mesopore of 30 nm pore size was synthesized.

<Preparation of Sulfur-Carbon Composite>

EXAMPLE 1

A solution was prepared by dissolving 0.032 g of diisopropenylbenzene and 0.288 g of sulfur ($S_8$) in 6 mL of $CS_2$ solvent. After dispersing 0.08 g of the porous carbon prepared in Preparation Example 1 in the solution, the solution was stirred at 40° C., until all of the $CS_2$ solvent was evaporated, to prepare a mixture in the form of powder.

The mixture was heat-treated at an oil bath at a temperature of 160° C. for 10 minutes to prepare a sulfur-carbon composite having sulfur and diisopropenylbenzene supported on the surface and in the pores of the porous carbon prepared in Preparation Example 1. The weight ratio of sulfur:diisopropenylbenzene:porous carbon of the prepared sulfur-carbon composite was 70:10:20.

COMPARATIVE EXAMPLE 1

A sulfur-carbon composite having sulfur supported on the surface and in the pores of the porous carbon prepared in Preparation Example 1 was prepared in the same manner as in Example 1, except that diisopropenylbenzene is not used. The weight ratio of sulfur:porous carbon of the prepared sulfur-carbon composite was 80:20.

COMPARATIVE EXAMPLE 2

A sulfur-carbon composite having sulfur and diisopropenylbenzene supported on the surface and in the pores of the carbon was prepared in the same manner as in Example 1, except that carbon black (super-P) instead of the porous carbon prepared in Preparation Example 1 is used. The weight ratio of sulfur:diisopropenylbenzene:carbon black of the prepared sulfur-carbon composite was 70:10:20.

EXPERIMENTAL EXAMPLE 1

Analysis of Sulfur-Carbon Composite

The state of sulfur and diisopropenylbenzene in sulfur-carbon composites prepared in Example 1 and Comparative Example 1 was analyzed.

1-1. Measurement by Differential Scanning Calorimetry

It was confirmed by differential scanning calorimetry (DSC) whether the peak corresponding to the exothermic reaction of elemental sulfur ($S_8$) exists.

The sulfur-carbon composite of Example 1 is a sulfur-carbon composite having sulfur and diisopropenylbenzene supported on the surface and in the pores of the porous carbon prepared in Preparation Example 1, and the sulfur-carbon composite of Comparative Example 1 is a sulfur-carbon composite having sulfur supported on the surface and in the pores of the porous carbon prepared in Preparation Example 1.

From the results of FIG. 3, it was confirmed that in the sulfur-carbon composite of Example 1, the peak corresponding to the exothermic reaction of elemental sulfur disappears. It is regarded as a result of proving that sulfur is chemically bonded, i.e., covalently bonded with diisopropenylbenzene in the mesopores and on the surface of porous carbon.

On the other hand, from the results of FIG. 4, it was confirmed that in the sulfur-carbon composite of Comparative Example 1, the peak corresponding to the exothermic reaction of elemental sulfur exists.

Therefore, it can be seen that in the sulfur-carbon composite prepared in Example 1 of the present invention, sulfur and diisopropenylbenzene are present on the surface and in the pores of the porous carbon in a state in which they are covalently bonded.

In addition, since the sulfur-carbon composite prepared in Comparative Example 2 is different from porous carbon in Example 1, but contains sulfur and diisopropenylbenzene, it can be expected that as in Example 1, sulfur and diisopropenylbenzene will be present on the surface and in the pores of the porous carbon in a state in which they are covalently bonded.

1-2. Measurement of XPS

X-ray photoelectron spectroscopy (XPS) was used to measure the chemical bonding state of the sulfur-carbon composites prepared in Example 1 and Comparative Example 1.

From the results of FIG. 5, the peak corresponding to C—S binding was observed near 162 eV. From this, it was confirmed that sulfur is chemically bonded, i.e., covalently bonded with diisopropenylbenzene in the mesopores and on the surface of the porous carbon.

On the other hand, from the results of FIG. 6, no peak corresponding to C—S binding was observed near 162 eV. From this, it was confirmed that carbon and sulfur did not form a chemical bond.

Therefore, it can be seen that in the sulfur-carbon composite prepared in Example 1 of the present invention, sulfur and diisopropenylbenzene are present on the surface and in the pores of porous carbon in a state in which they are covalently bonded.

In addition, since the sulfur-carbon composite prepared in Comparative Example 2 is different from porous carbon in Example 1, but contains sulfur and diisopropenylbenzene, it can be expected that as in Example 1, sulfur and diisopropenylbenzene will be present on the surface and in the pores of the porous carbon in a state in which they are covalently bonded.

EXPERIMENTAL EXAMPLE 2

Evaluation of Discharging Capacity and Lifetime Characteristics of Lithium-Sulfur Battery The sulfur-carbon composites prepared in Example 1 and Comparative Examples 1 and 2 were used as a positive electrode active material. After preparing a positive electrode slurry by adding a positive electrode composition consisting of 80 wt. % of the positive electrode active material, 10 wt. % of the conductive material and 10 wt. % of the binder to N-methyl-2-pyrrolidone (NMP) as a solvent, the slurry was coated with a thickness of 20 μm on an aluminum foil current collector, and dried at a temperature of 60° C. to prepare a positive electrode for a lithium-sulfur battery. At this time, the sulfur content in the positive electrode is 2.5 mg/cm$^2$.

Carbon black was used as the conductive material, and PVDF was used as the binder.

Lithium foil having a thickness of 200 μm was used as the negative electrode, an organic solution in which 2 wt. % of LiNO$_3$ additive was dissolved in 1M LiTFSI (DME/DOL, 1:1 volume ratio) was used as the electrolyte solution, and a polypropylene film was used as the separator to prepare a lithium-sulfur battery.

LiTFSI: bis(trifluoromethane) sulfonimide lithium salt
DME: dimethoxymethane
DOL: 1,3-dioxolane 2-1. Evaluation of Discharging Capacity The lithium-sulfur batteries of Example 1, and Comparative Examples 1 and 2 were subjected to an experiment of the discharging capacity by analysis the voltage profile in the first charging/discharging cycle. In the experiment of the discharging capacity, the galvanostatic test was used to define 1 C rate as 1672 mA/g, and the galvanostatic test was performed at 0.2 C rate.

FIG. 7 is a graph showing voltage profiles according to capacities for the lithium-sulfur batteries of Example 1 and Comparative Examples 1 and 2

The initial discharging capacity of the lithium-sulfur battery of Example 1 was 912 mA/g, the initial discharging capacity of the lithium-sulfur battery of Comparative Example 1 was 843 mA/g, and the initial discharging capacity of Comparative Example 2 was 685 mA/g.

The porous carbon of the sulfur-carbon composite of Example 1 has mesopores (first mesopores and second mesopores), and the pore volume is relatively large. Therefore, sulfur and diisopropenylbenzene were efficiently supported, resulting in large discharging capacity. In addition, sulfur and diisopropenylbenzene form a covalent bond, so that the diisopropenylbenzene reversibly reacts with the polysulfides generated during charging and discharging of the lithium-sulfur battery, resulting in a large discharging capacity.

Since the sulfur-carbon composite of Comparative Example 1 is the same as the porous carbon of Example 1, sulfur was efficiently supported on the porous carbon, but the discharging capacity was smaller than that of Example 1 because it did not contain diisopropenylbenzene.

The sulfur-carbon composite of Comparative Example 2 includes sulfur and diisopropenylbenzene, but the porous carbon of Comparative Example 2 is not the same porous structure as the porous carbon of Example 1, so the specific surface area and pore volume are smaller than those of the porous carbon of Example 1. Therefore, the sulfur-carbon composite of Comparative Example 2 had a lower carrying capacity of sulfur and diisopropenylbenzene and a smaller contact area with porous carbon having electrical conductivity, so that the discharge capacity was smaller than that of Example 1.

2-2. Evaluation of Lifetime Characteristic

The lifetime characteristics of the lithium-sulfur batteries of Example 1, and Comparative Examples 1 and 2 were evaluated.

Galvanostatic charge-discharge analysis was performed at a voltage range of 1.7 V to 3.0 V (vs Li/Li$^+$) at 0.2 C (1 C: 1672 mA/g).

FIG. 8 is a graph showing the results of galvanostatic charge-discharge analysis of the lithium-sulfur batteries of Example 1, and Comparative Examples 1 and 2.

Sulfur and diisopropenylbenzene of the sulfur-carbon composite of Example 1 form a covalent bond. Diisopropenylbenzene was reversibly reacted with the polysulfides generated during charging and discharging of the lithium-sulfur battery, resulting in excellent lifetime characteristic and the capacity retention rate of about 64%.

The sulfur-carbon composite of Comparative Example 1 does not contain diisopropenylbenzene, resulting in lower lifetime characteristic than that of Example 1 and the capacity retention rate of about 40%.

The sulfur-carbon composite of Comparative Example 2 does not contain porous carbon containing mesopores, and thus sulfur and diisopropenylbenzene cannot be supported as in Example 1. The lifetime characteristics were lower than that of Example 1, and the capacity retention rate was 55%.

In addition, as a result of observing the separator of the lithium-sulfur battery after 50 cycles, it could be confirmed that the separator of Comparative Example 1 was changed to yellow (FIG. 10) while the separator of Example 1 was transparent (FIG. 9).

The polysulfides have a yellow to brown color. From the observation of the separator, it was found that in the case of Example 1 of the present invention, leaching of the polysulfides was alleviated from the sulfur-carbon composite, and it was found that Comparative Example 1, which does not contain diisopropenylbenzene, does not effectively control the leaching of the polysulfides.

Therefore, from the above results, it can be seen that the porous carbon having mesopores, the sulfur-carbon composite of the present invention supported by the covalent bond of sulfur and diisopropenylbenzene in the pores and on the surface of the porous carbon, the lithium-sulfur battery comprising the same has excellent discharging capacity and lifetime characteristics.

This is due to the improved supporting efficiency for sulfur and diisopropenylbenzene by the pore volume of porous carbon. In addition, sulfur and diisopropenylbenzene are covalently bonded, and the diisopropenylbenzene reversibly reacts with the polysulfides to control the leaching of the polysulfides, thereby improving the lifetime characteristic of the lithium-sulfur battery.

The invention claimed is:

1. A sulfur-carbon composite comprising:
porous carbon;
diisopropenylbenzene; and
sulfur,
wherein the diisopropenylbenzene and sulfur are supported in pores of the porous carbon and on a surface of the porous carbon,
wherein the pores of the porous carbon contain first mesopores having a diameter of 2 nm to 8 nm and second mesopores having a diameter of 20 nm to 50 nm,
wherein the porous carbon comprises the first mesopores and the second mesopores in a pore volume ratio of 1:20 to 70,
wherein the diisopropenylbenzene and sulfur are covalently bonded, and
wherein the porous carbon is a spherical particle having a particle diameter of 2 μm to 10 μm.

2. The sulfur-carbon composite of claim 1, wherein a pore volume of the second mesopores is at least 3.5 cm$^3$/g.

3. The sulfur-carbon composite of claim 1, wherein a specific surface area of the porous carbon is 1000 cm$^2$/g to 1300 cm$^2$/g.

4. The sulfur-carbon composite of claim 1, wherein the diisopropenylbenzene is present in an amount of 5% by weight to 30% by weight based on a total weight of the sulfur-carbon composite.

5. A method for preparing the sulfur-carbon composite according to claim 1, comprising the steps of:
(1) dispersing porous silica in an organic solvent, and mixing a hydrate for introducing an Al acid site to prepare a porous silica dispersion;
(2) evaporating the organic solvent from the porous silica dispersion to obtain porous silica particles;
(3) performing a first heat treatment on the porous silica particles to obtain porous silica particles having the Al acid site introduced therein;
(4) impregnating pores of the porous silica particles having the Al acid site introduced therein with a carbon precursor, and then performing a second heat treatment to obtain a carbon-silica composite;
(5) etching silica from the carbon-silica composite to obtain porous carbon;
(6) preparing a solution by dissolving diisopropenylbenzene and sulfur;
(7) dispersing the porous carbon into the solution of diisopropenylbenzene and sulfur to prepare a mixture; and
(8) performing a third heat treatment on the mixture to support diisopropenylbenzene and sulfur in pores of the porous carbon and on a surface of the porous carbon.

6. The method for preparing the sulfur-carbon composite of claim 5, wherein the hydrate for introducing the Al acid site is aluminum chloride hexahydrate.

7. The method for preparing the sulfur-carbon composite of claim 5, wherein the first heat treatment is heated to 500° C. to 600° C. at a rate of 0.5° C./min to 3° C./min.

8. The method for preparing the sulfur-carbon composite of claim 5, wherein the carbon precursor is at least one selected from the group consisting of furfuryl alcohol, sucrose and glucose.

9. The method for preparing the sulfur-carbon composite of claim 5, wherein the second heat treatment is performed for 7 hours to 10 hours at 70° C. to 100° C.

10. The method for preparing the sulfur-carbon composite of claim 5, further comprising:
after the second heat treatment, heat-treating for 1 hour to 5 hours at 700° C. to 1000° C. by increasing the temperature at a rate of 0.5° C./min to 3° C./min under an inert atmosphere.

11. The method for preparing the sulfur-carbon composite of claim 5, wherein an etching solution used in the etching is a solution comprising at least one selected from the group consisting of hydrofluoric acid, hydrogen peroxide, nitric acid, potassium hydroxide and sodium hydroxide.

12. The method for preparing the sulfur-carbon composite of claim 5, wherein a solvent into which diisopropenylbenzene and sulfur are dissolved comprises at least one selected from the group consisting of $CS_2$, ethylenediamine, acetone and ethanol.

13. The method for preparing the sulfur-carbon composite of claim 5, wherein the diisopropenylbenzene and sulfur are mixed in a weight ratio of 5:95 to 30:70.

14. The method for preparing the sulfur-carbon composite of claim 5, wherein the third heat treatment is performed for 1 minute to 30 minutes at a temperature of 100° C. to 200° C.

15. A positive electrode for a lithium secondary battery comprising the sulfur-carbon composite of claim 1.

16. The positive electrode for the lithium secondary battery of claim 15, wherein the positive electrode for the lithium secondary battery is a positive electrode for a lithium-sulfur battery.

17. A lithium secondary battery comprising a positive electrode; a negative electrode; a separator interposed between the positive electrode and the negative electrode and an electrolyte, wherein the positive electrode is the positive electrode of claim 15.

18. The lithium secondary battery of claim 17, wherein the lithium secondary battery is a lithium-sulfur battery.

* * * * *